(12) United States Patent
Ament

(10) Patent No.: US 7,240,481 B2
(45) Date of Patent: Jul. 10, 2007

(54) ENGINE LOAD CONTROL FOR REDUCED COLD START EMISSIONS

(75) Inventor: Frank Ament, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 37 days.

(21) Appl. No.: 11/076,722

(22) Filed: Mar. 10, 2005

(65) Prior Publication Data
US 2006/0201136 A1  Sep. 14, 2006

(51) Int. Cl.
F01N 3/00 (2006.01)

(52) U.S. Cl. .............. 60/284; 60/274; 60/286; 60/300; 60/303; 123/339.18; 123/406.58

(58) Field of Classification Search .......... 60/274, 60/280, 284, 286, 300, 303; 123/329, 339.18, 123/406.35, 406.58
See application file for complete search history.

(56) References Cited

U.S. PATENT DOCUMENTS

| 5,390,493 | A | * | 2/1995 | Fujishita et al. ............ 60/284 |
| 5,836,151 | A | * | 11/1998 | Atanasyan et al. ........... 60/274 |
| 5,936,314 | A | * | 8/1999 | Suganuma et al. ........ 307/10.1 |
| 5,966,931 | A | * | 10/1999 | Yoshizaki et al. ............ 60/284 |
| 6,192,673 | B1 | * | 2/2001 | Gross et al. .................. 60/284 |
| 6,657,315 | B1 | * | 12/2003 | Peters et al. .............. 290/40 C |
| 6,692,406 | B2 | * | 2/2004 | Beaty .......................... 477/32 |
| 7,007,460 | B2 | * | 3/2006 | Frieden et al. ................ 60/284 |
| 2004/0150375 | A1 | | 8/2004 | Namuduri et al. |
| 2005/0034449 | A1 | | 2/2005 | Frieden et al. ................ 60/284 |

FOREIGN PATENT DOCUMENTS

| EP | 1186463 | 3/2002 |
| EP | 1410935 | 4/2004 |
| EP | 1508682 | 2/2005 |

* cited by examiner

Primary Examiner—Binh Q. Tran
(74) Attorney, Agent, or Firm—Christopher DeVries

(57) ABSTRACT

A control system for an engine that drives an alternator includes a first module that reduces an alternator load when the engine is cranked. A second module determines a desired exhaust energy rate (EER) of the engine. The first module regulates the alternator load based on the EER during an idle period to reduce engine emissions during a cold start period.

18 Claims, 6 Drawing Sheets

ENGINE LOAD CONTROL FOR REDUCED COLD START EMISSIONS

FIELD OF THE INVENTION

The present invention relates to vehicles, and more particularly to a engine load control for reducing cold start engine emissions.

BACKGROUND OF THE INVENTION

During combustion, an internal combustion engine oxidizes gasoline and combines hydrogen ($H_2$) and carbon (C) with air. Combustion creates chemical compounds such as carbon dioxide ($CO_2$), water ($H_2O$), carbon monoxide (CO), nitrogen oxides ($NO_x$), unburned hydrocarbons (HC), sulfur oxides ($SO_x$), and other compounds. During an initial startup period after a long soak, the engine is still "cold" after starting and combustion of the gasoline is incomplete. A catalytic converter treats exhaust gases from the engine. During the startup period, the catalytic converter is also "cold" and does not operate optimally.

Besides fuel vaporization and combustion challenges during cold start, the level and variability of electrical loads make cold start fuel and spark control difficult. As a result, a non-optimum cold start fuel calibration is provided that accommodates extreme engine load conditions. In effect, the emissions calibration is penalized for a relatively small percentage of worst-case combinations of ambient temperature, fuel volatility and engine load conditions during cold start.

SUMMARY OF THE INVENTION

Accordingly, the present invention provides a control system for an engine that drives an alternator. The control system includes a first module that reduces an alternator load when the engine is cranked. A second module determines a desired exhaust energy rate (EER) of the engine. The first module regulates the alternator load based on the EER during an idle period to reduce engine emissions during a cold start period.

In one feature, the first module limits the alternator load during the idle period based on a manifold absolute pressure (MAP) threshold.

In another feature, the first module regulates engine spark based on the desired EER during said idle period to heat said exhaust system.

In still another feature, the first module reduces the alternator load during an engine acceleration to limit a manifold absolute pressure (MAP).

In yet other features, the desired EER is determined based on an engine temperature. The engine temperature is determined based on at least one of an ambient temperature, an engine coolant temperature and an engine oil temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
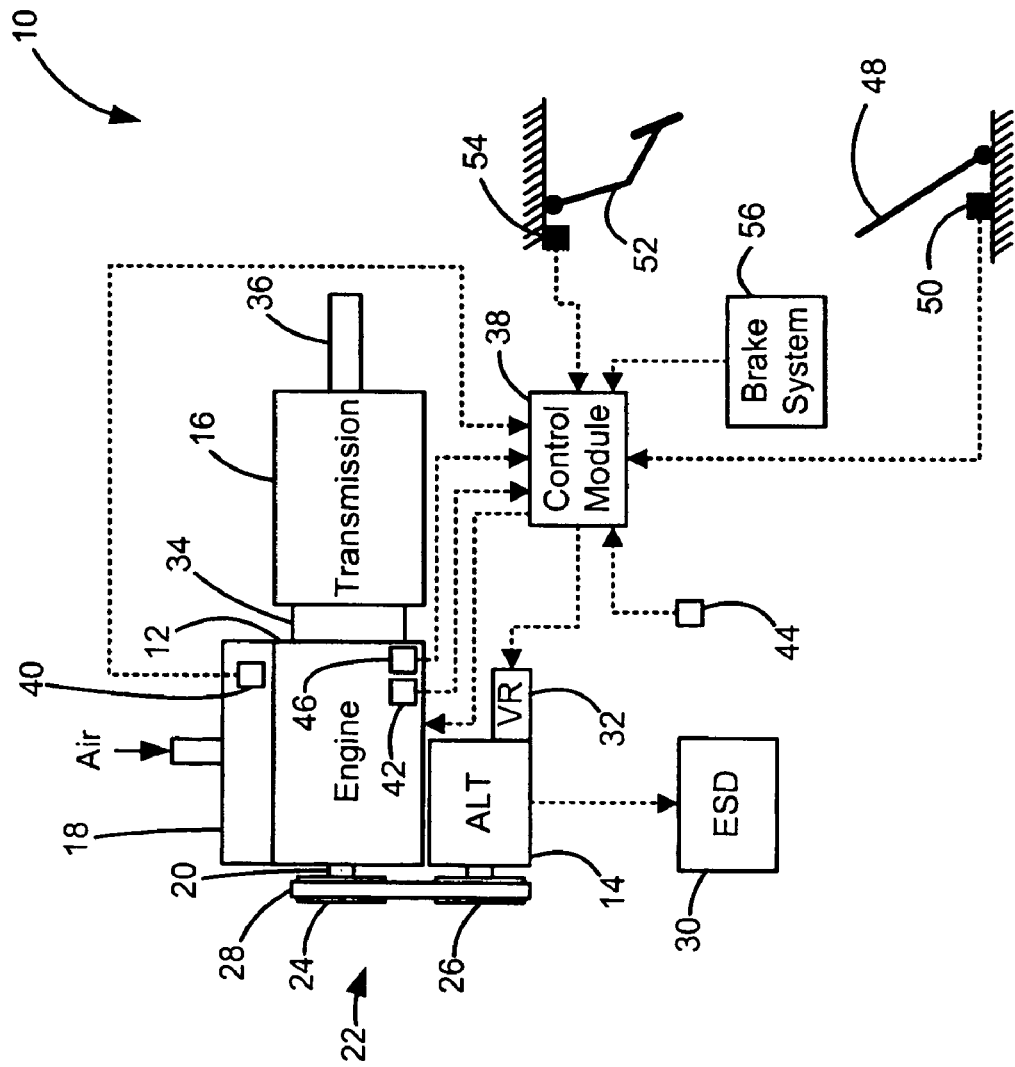
FIG. 1 is a schematic illustration of an exemplary vehicle that is operated based on the engine load control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle 10 includes an engine 12, an alternator 14 and a transmission 16. The engine 12 produces drive torque to drive the alternator 14 and the transmission 16. More specifically, the engine 12 draws air into an intake manifold 18 that distributes the air to a cylinder (not shown) where it is combined with fuel to form an air/fuel mixture. The air/fuel mixture is combusted to drive a piston (not shown) within the cylinder, thereby driving a crankshaft 20 to generate drive torque. The combustion process is initiated be a spark generated by a spark plug (not shown). The timing of the spark, relative to the position of the cylinder within the piston, can be adjusted (i.e., retarded or advanced) to regulate exhaust temperature, engine torque and manifold absolute pressure (MAP).

The engine 12 and the alternator 14 are coupled via a belt system 22. The engine 12 and the alternator 14 include pulleys 24, 26, respectively, that are coupled for rotation by a belt 28. The pulley 24 is coupled for rotation with the crankshaft 20 of the engine 12. The engine 12 drives the alternator 14 to generate power used by vehicle systems and/or to recharge an energy storage device (ESD) 30. The alternator 14 includes a variable load on the engine 12 that is regulated by a voltage regulator (VR) 32. When more electrical energy is required from the alternator 14, the VR 32 increases the alternator load, thereby increasing the amount of engine work. When less electrical energy is required from the alternator 14, the VR 32 decreases the alternator load, thereby decreasing the amount of engine work. During normal engine operation, the alternator load is regulated based on a standard load control strategy. An exemplary load control strategy is disclosed in commonly assigned U.S. Pat. Pub. No. US2004/0150375, the disclosure of which is expressly incorporated herein by reference.

The transmission 16 can include, but is not limited to, a manual transmission, an automatic transmission, a continuously variable transmission (CVT) and an automated manual transmission (AMT). Drive torque is transferred from the engine crankshaft 20 to the transmission 16 through a coupling device 34. The coupling device 34 can include, but is not limited to, a friction clutch or a torque converter depending upon the type of transmission implemented. The transmission 16 multiplies the drive torque through one of a plurality of gear ratios to drive a driveshaft 36.

A control module 38 regulates operation of the vehicle 10 based on the engine load control system of the present invention. The control module 38 controls fuel injection, spark and alternator load to regulate engine emissions during start of the engine 12. A manifold absolute pressure (MAP) sensor 40 is responsive to the MAP within the intake manifold 18 and generates a MAP signal based thereon. An engine temperature sensor 42 is responsive to an engine temperature and generates an engine temperature signal based thereon. It is anticipated that the engine temperature can be determined from a coolant temperature and/or an oil temperature of the engine 12. An ambient temperature sensor 44 is responsive to an ambient temperature and generates an ambient temperature signal based thereon. It is anticipated that the engine temperature can be further determined based on the ambient temperature. A speed sensor 46 is responsive to the rotational speed (RPM) of the engine 12 and generates a speed signal based thereon.

An accelerator pedal 48 is provided. A pedal position sensor 50 is sensitive to a position of the accelerator pedal 48 and generates a pedal position signal based thereon. A brake pedal 52 is provided. A brake pedal position sensor 54 is sensitive to a position of the brake pedal 52 and generates a pedal position signal based thereon. The control module 38 operates a brake system 56 based on the brake pedal position signal to adjust a pressure within the brake system, which in turn regulates a braking force of brakes (not shown).

The engine load control system regulates engine load during cold start to improve emissions, to heat the catalytic converter (not shown) and to maintain driveability (i.e., smooth engine operation). The term cold start describes the scenario where the vehicle 10, the engine 12 in particular, is cranked or started while at an ambient temperature. This typically occurs when the engine 12 is off and the vehicle is at rest for an extended period. A cold start temperature is one that is less than approximately 90° F. In contrast, a warm start refers to the situation where the engine 12 is turned off and is restarted before the engine 12 is able to cool to a temperature within the cold start temperature range.

During cold start, the engine load control system reduces the alternator load during initial engine cranking, whereby the engine 12 is cranked and the cylinders begin processing the air/fuel mixtures and while the engine speed runs up to a predetermined fast idle speed. After the initial engine cranking and speed run-up, the engine load control system regulates the alternator load during a heating period to maximize exhaust heat to more rapidly heat the catalytic converter. Upon a driver initiated drive cycle (i.e., acceleration), the engine load control system regulates engine spark and alternator load to limit MAP to maintain good fuel vaporization, thereby improving emissions and drivability.

Figure 2:
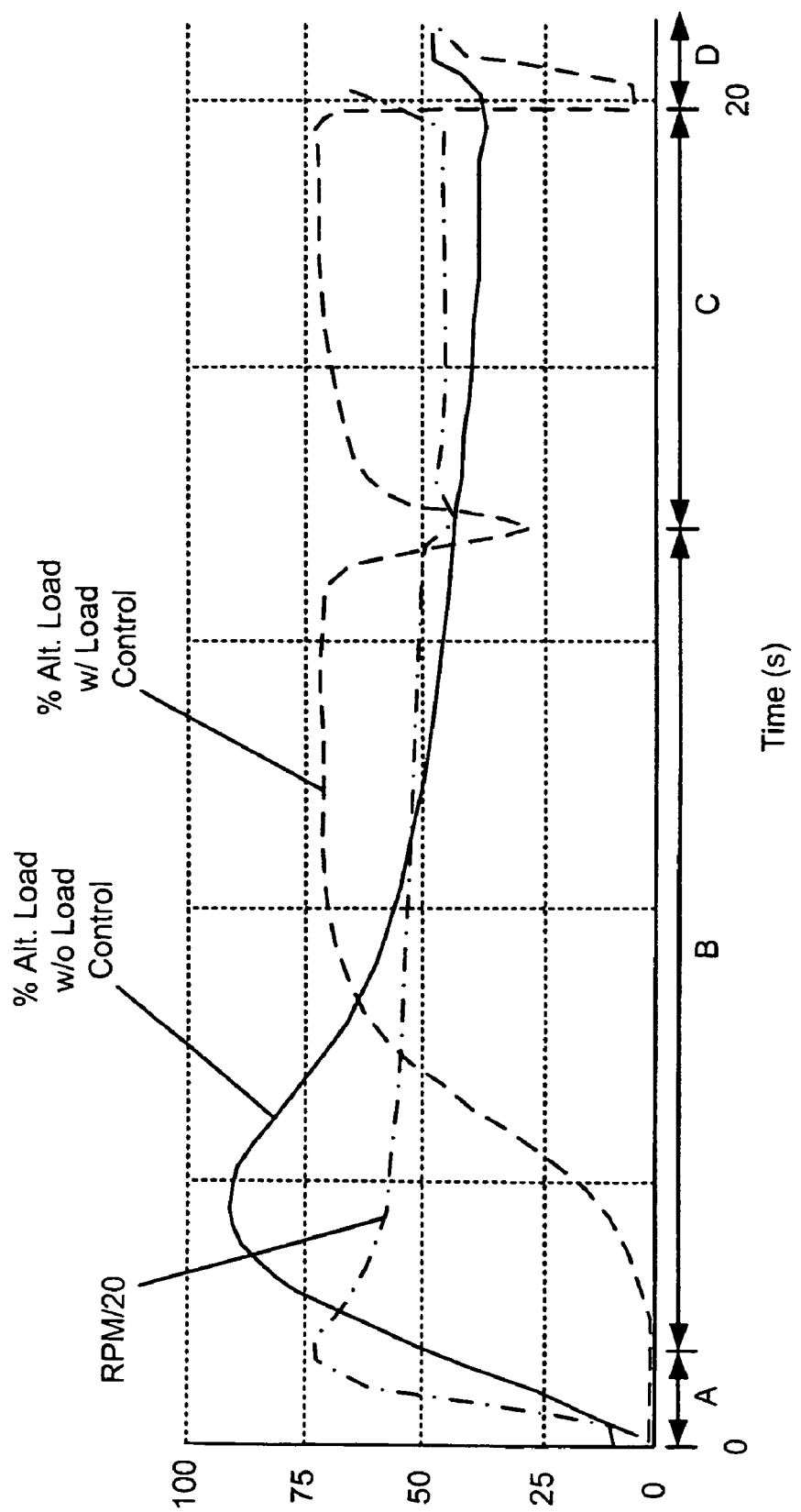
FIG. 2 is a graph illustrating exemplary alternator loads during a start-up period.

Referring now to FIG. 2 a graph illustrating an alternator load curve without engine load control (i.e., traditional alternator load) and an alternator load with engine load control is provided. During the initial engine cranking (period A), the engine load control system reduces the alternator load to 0%. In this manner, the alternator 14 puts no load on the engine 12, reducing the amount of cranking work required to get the engine 12 running and minimizing the fueling during the engine run-up to the fast idle condition. During the subsequent fast idle (periods B and C), during which the transmission 16 is in neutral (period B) and/or is shifted into gear (period C), the alternator load is regulated to generate electrical energy to power vehicle accessories and to charge the ESD 30. As indicated by the area beneath the traditional alternator load curve, a majority of the electrical energy is generated immediately after engine start. As indicated by the area beneath the alternator load curve with engine load control, the electrical energy is generated over the idle period to meet vehicle electrical demands.

Also during the subsequent fast idle (periods B and C), the alternator load is regulated to heat the catalytic converter. More specifically, the alternator load and spark timing are adjusted during this period to provide a desired exhaust energy rate (EER), as discussed in further detail below. In this manner, heating of the catalytic converter is optimized. During vehicle drive cycles (period D), the alternator load is regulated to limit peak MAP. More specifically, as the vehicle accelerates, the alternator load is reduced to reduce the MAP achieved. In this manner, good fuel vaporization is maintained while the intake manifold and port surfaces are still cold.

Figure 3:
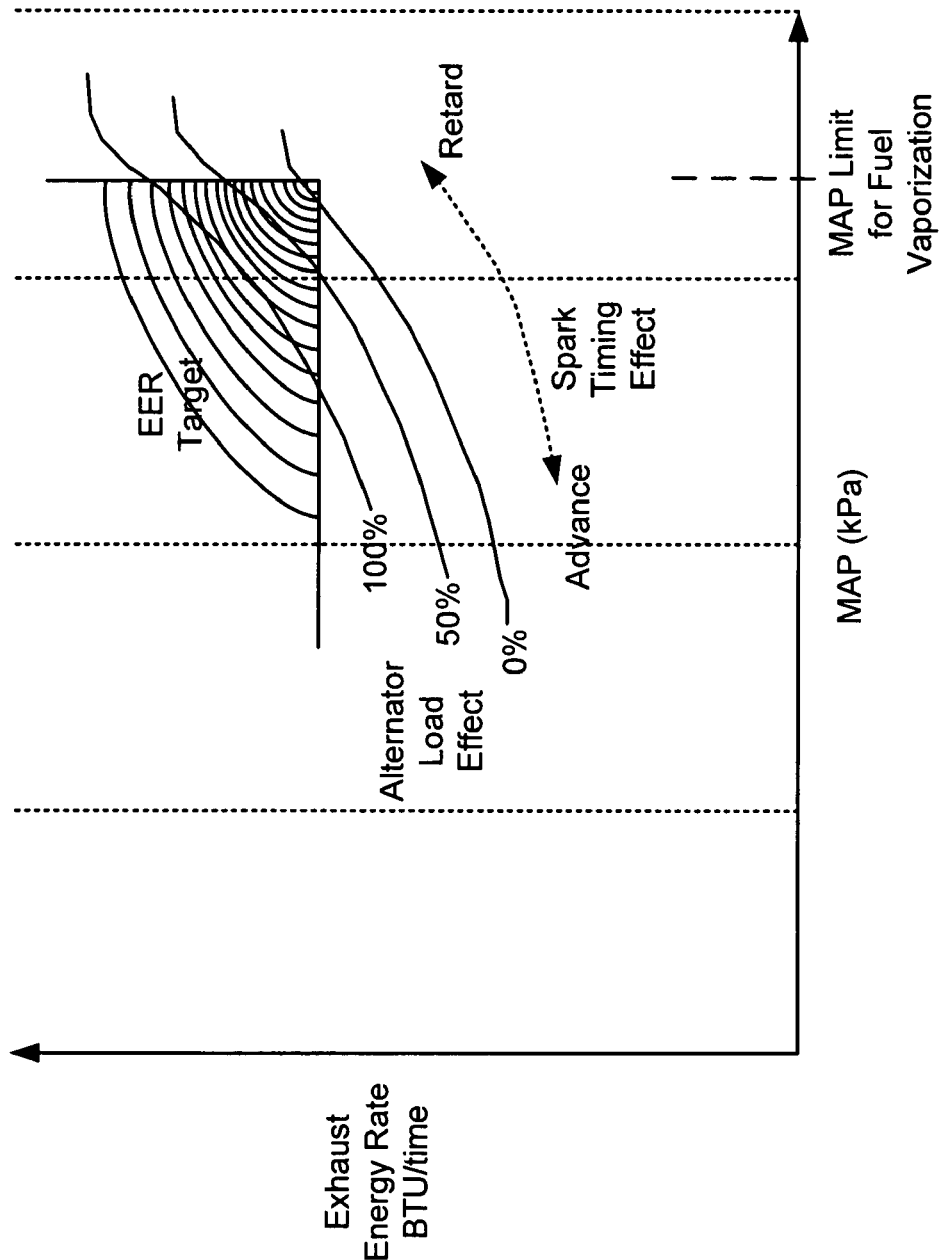
FIG. 3 is a graph illustrating alternator load and spark timing effect on an exhaust energy rate (EER) and a manifold absolute pressure (MAP)

Referring now to FIG. 3, a graph illustrates the alternator load and spark timing effect on the exhaust energy rate (EER) and MAP. As alternator load is increased, the EER increases. As the spark timing is retarded, both the EER and the MAP increase. An exemplary EER target area is illustrated and indicates a desired range of EER rates to heat the catalytic converter during the fast idle period (periods B and C). More specifically, the control module adjusts both the alternator load and the spark timing to achieve a desired EER ($EER_{DES}$) within the EER target area while maintaining the MAP below a MAP limit ($MAP_{LIMIT}$). In this manner, the catalytic converter can be heated while limiting the MAP to maintain good fuel vaporization.

$EER_{DES}$ is determined based on the engine temperature ($T_{ENG}$), which can be determined based on the engine coolant temperature ($T_{COOL}$), the engine oil temperature ($T_{OIL}$) and/or the ambient temperature ($T_{AMB}$). It is anticipated that $EER_{DES}$ and $MAP_{LIMIT}$ can be determined from respective look-up tables based on $T_{ENG}$. The control module regulates the alternator load and the spark timing to achieve $EER_{DES}$ while maintaining MAP below $MAP_{LIMIT}$.

Figure 4:
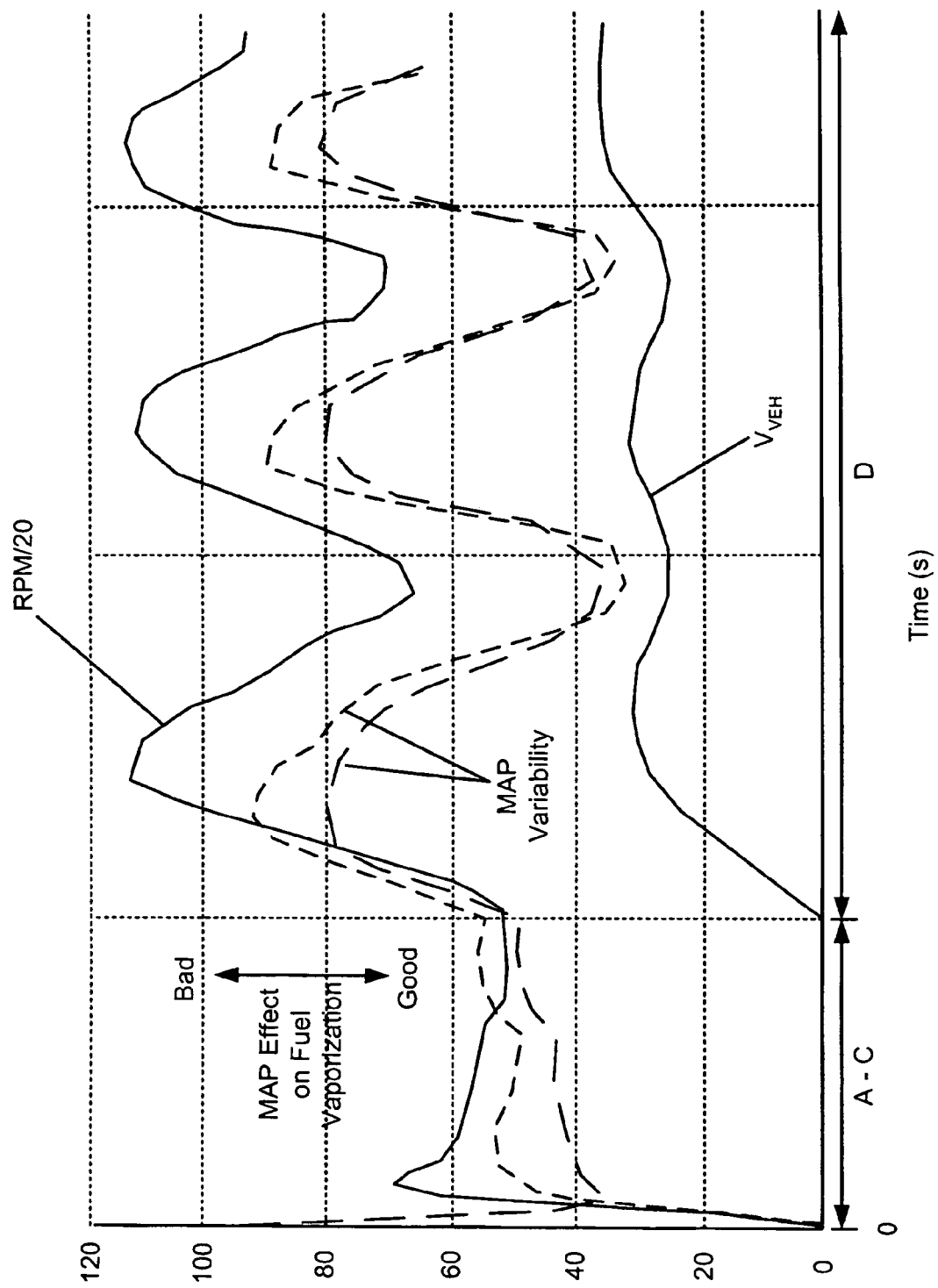
FIG. 4 is a graph illustrating MAP limits for a portion of an exemplary vehicle drive cycle.

Referring now to FIG. 4, a graph illustrates MAP variability for an exemplary drive cycle. This variability is partly attributable to the differences in the ESD charge level and variation in the alternator load needed to charge the ESD 30. As MAP increases the quality of fuel vaporization decreases and therefore, more liquid fuel must be injected to maintain the proper A/F mixture. Good fuel vaporization is required to maintain drivability (i.e., stable engine operation) and to improve emissions. The engine load control system of the present invention regulates the alternator load during vehicle acceleration to reduce the MAP variability and to maintain MAP below $MAP_{LIMIT}$ to provide good fuel vaporization.

Figure 5:
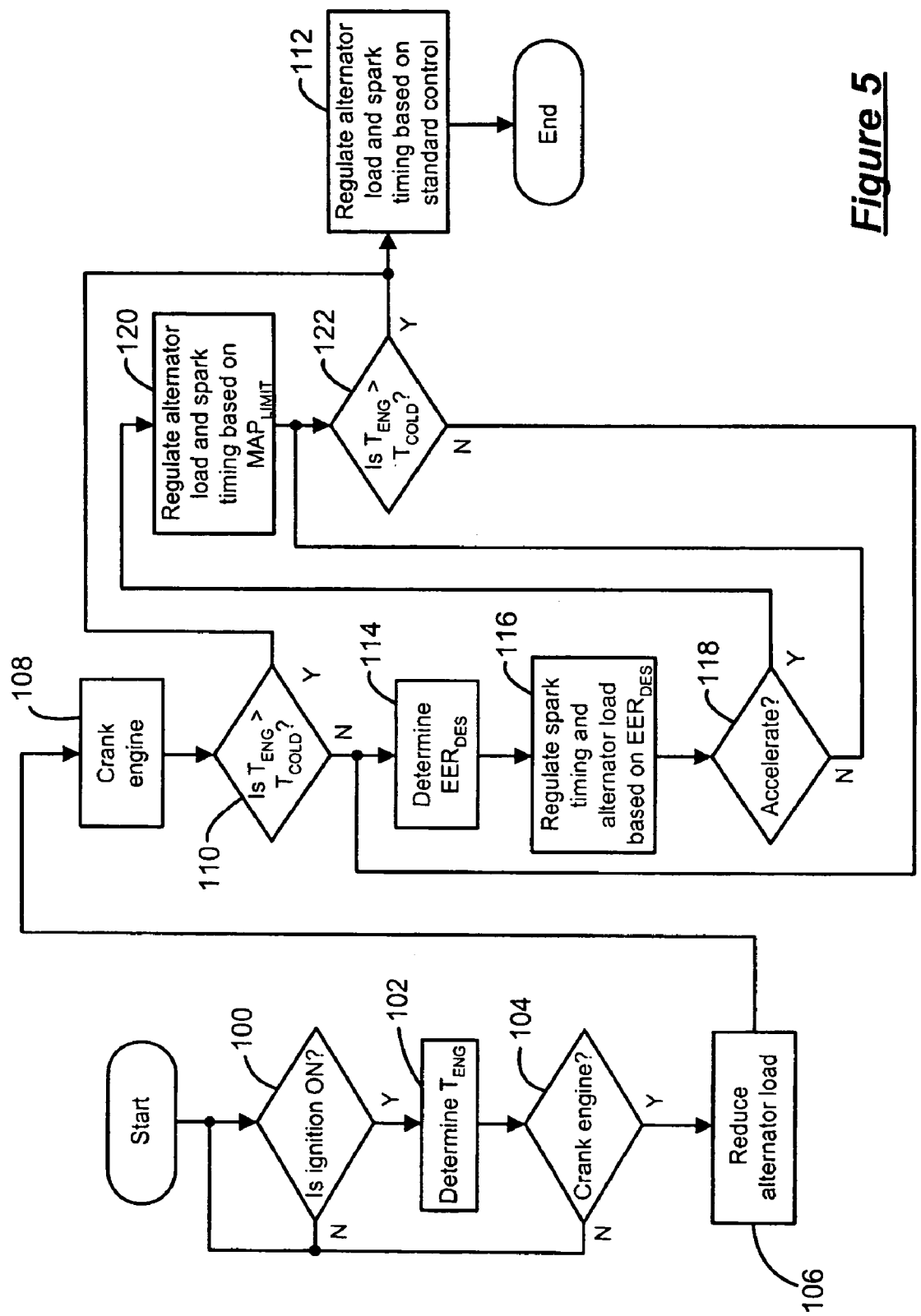
FIG. 5 is a flowchart illustrating steps performed by the engine load control system according to the present invention.

Referring now to FIG. 5, steps illustrated by the engine load control system of the present invention will be described in detail. In step 100, control determines whether the ignition is ON. If the ignition is not ON, control loops back. If the ignition is ON, control determines $T_{ENG}$ in step 102. In step 104, control determines whether the engine 12 is to be cranked. This is generally indicated by the driver turning the ignition to crank. If the engine 12 is not to be cranked, control loops back to step 100. If the engine 12 is to be cranked, control continues in step 106.

In step 106, control reduces the alternator load to reduce the amount of crank work required to start the engine 12. In step 108, control cranks the engine 12. In step 110, control determines whether $T_{ENG}$ is greater than a cold-start temperature threshold ($T_{COLD}$). If $T_{ENG}$ is greater than $T_{COLD}$, the engine start is considered a warm start and control continues in step 112. If $T_{ENG}$ is not greater than $T_{COLD}$, the engine start is considered a cold start and control determines $EER_{DES}$ in step 114. In step 116, control regulates the spark timing and the alternator load based on $EER_{DES}$.

In step 118, control determines whether the vehicle is to accelerate. Vehicle acceleration can be based on driver input through the accelerator pedal 48. If the vehicle is to accelerate, control continues in step 120. If the vehicle is not to accelerate, control continues in step 122. In step 120, control regulates the alternator load and spark timing based on $MAP_{LIMIT}$. During acceleration, as $MAP_{LIMIT}$ is approached, the alternator load is reduced to zero and the spark timing is advanced to provide additional power. If at this point, the requested power is not achieved, MAP is allowed to exceed $MAP_{LIMIT}$. During typical cold-start conditions, control of the alternator load and the spark timing provides sufficient torque reserve to maintain MAP below $MAP_{LIMIT}$. In step 122, control determines whether $T_{ENG}$ is greater than $T_{COLD}$. If $T_{ENG}$ is greater than $T_{COLD}$, the engine 12 is considered warm and control continues in step 112. If $T_{ENG}$ is not greater than $T_{COLD}$, the engine 12 is still considered cold and control loops back to step 114. In step 112, control regulates alternator load and spark timing based on the standard control strategy.

Figure 6:
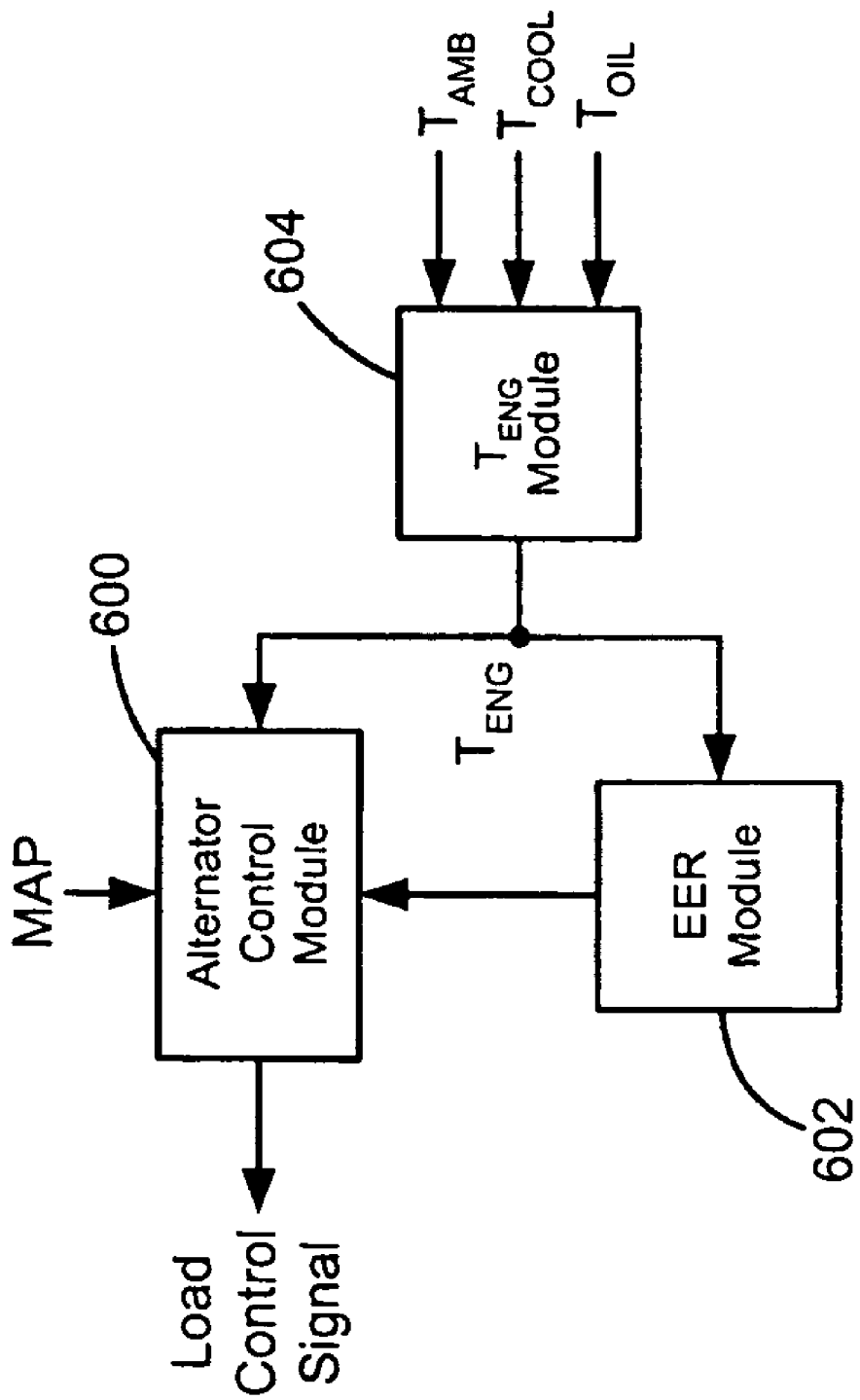
FIG. 6 is a schematic illustration of exemplary control modules that execute the engine load control according to the present invention.

Referring now to FIG. 6, exemplary modules that execute the engine load control of the present invention are schematically illustrated. The modules include an alternator load control module 600, an EER module 602 and a $T_{ENG}$ module 604. The $T_{ENG}$ module 604 determines TENG based on at least one of $T_{AMB}$, $T_{COOL}$ and $T_{OIL}$. The EER module 602 determines $EER_{DES}$ based on $T_{ENG}$. The alternator control module 600 generates an alternator load control signal based on $T_{ENG}$, $EER_{DES}$ and MAP.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for an engine that drives an alternator, comprising:
   a first module that reduces an alternator load when said engine is cranked; and
   a second module that determines a desired exhaust energy rate (EER) of said engine, wherein said first module regulates said alternator load based on said EER during an idle period to reduce engine emissions and improve drivability during a cold start period.

2. The control system of claim 1 wherein said first module limits said alternator load during said idle period based on a manifold absolute pressure (MAP) threshold.

3. The control system of claim 1 wherein said first module regulates engine spark based on said desired EER during said idle period to heat an exhaust system.

4. The control system of claim 1 wherein said first module reduces said alternator load during an engine acceleration to limit a manifold absolute pressure (MAP).

5. The control system of claim 1 wherein said desired EER is determined based on an engine temperature.

6. The control system of claim 5 wherein said engine temperature is determined based on at least one of an ambient temperature, an engine coolant temperature and an engine oil temperature.

7. A method of regulating an engine load during cold start, comprising:
   reducing an alternator load on an engine;
   cranking said engine to initiate a combustion process;
   determining a desired exhaust energy rate (EER) from said engine; and
   regulating said alternator load during an idle period based on said desired EER.

8. The method of claim 7 further comprising regulating a spark timing of said engine during said idle period based on said desired EER.

9. The method of claim 8 wherein said spark timing and said alternator load are regulated to maintain a manifold absolute pressure (MAP) of said engine below a threshold MAP.

10. The method of claim 7 wherein said desired EER is determined based on an engine temperature.

11. The method of claim 10 wherein said engine temperature is determined based on at least one of an ambient temperature, an engine coolant temperature and an engine oil temperature.

12. The method of claim 7 further comprising reducing said alternator load during engine acceleration to limit a manifold absolute pressure (MAP).

13. A method of regulating engine load, comprising:
   determining whether an engine temperature is below a cold start temperature;
   reducing an alternator load on an engine;
   cranking said engine to initiate a combustion process;
   determining a desired exhaust energy rate (EER) from said engine; and
   regulating said alternator load during an idle period based on said desired EER when said engine temperature is below said cold start temperature.

14. The method of claim 13 further comprising regulating a spark timing of said engine during said idle period based on said desired EER.

15. The method of claim 14 wherein said spark timing and said alternator load are regulated to maintain a manifold absolute pressure (MAP) of said engine below a threshold MAP.

16. The method of claim 13 wherein said desired EER is determined based on said engine temperature.

17. The method of claim 16 wherein said engine temperature is determined based on at least one of an ambient temperature, an engine coolant temperature and an engine oil temperature.

18. The method of claim 13 further comprising reducing said alternator load during engine acceleration to limit a manifold absolute pressure (MAP).

* * * * *